July 21, 1964      H. L. BERGERSON ETAL      3,141,654
VEHICLE WITH BOOM
Filed Feb. 20, 1961
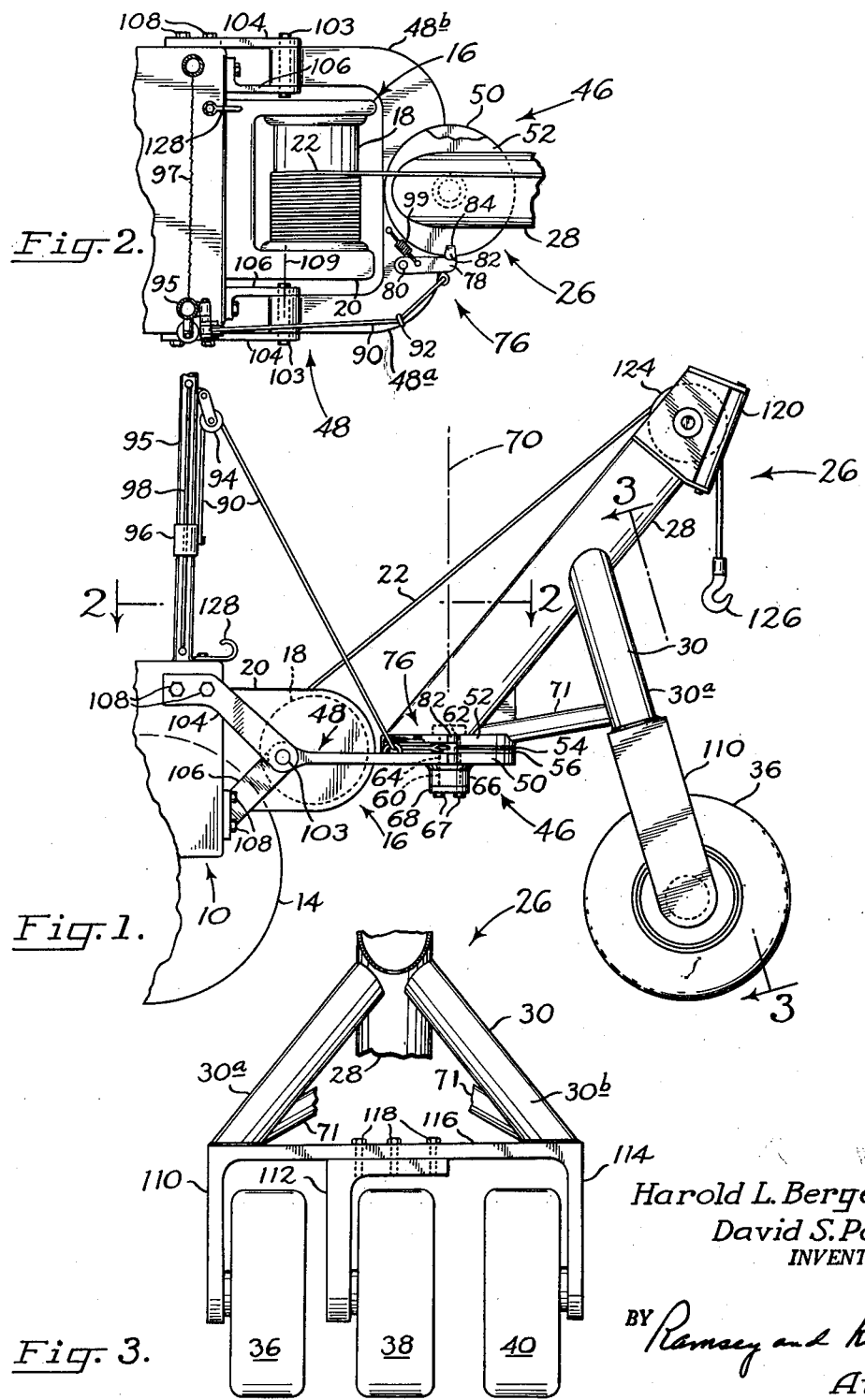
Harold L. Bergerson
David S. Potter
INVENTORS
BY Ramsey and Kolisch
Attys.

3,141,654
VEHICLE WITH BOOM
Harold L. Bergerson, Keasey Rte., Vernonia, Oreg., and David S. Potter, Vernonia, Oreg.; said Potter assignor to said Bergerson
Filed Feb. 20, 1961, Ser. No. 90,445
4 Claims. (Cl. 254—139.1)

This invention relates to vehicles equipped with booms, and more particularly to an improved construction for a vehicle having a boom where the boom is provided with dolly wheel means for supporting it. Vehicles of this description find extensive use in logging operations, where they are employed to pull logs over the ground after the logs are felled. Obviously they have practicability in other uses, however.

In a logging operation, a common method of transporting logs is to prepare a bundle of logs and pull such a bundle over the ground while lifting its forward end. Ordinarily a tractor with a logging boom or arch is used, and a cable trained over the top of the boom has an end secured about the logs. The cable is tensioned, by winding the cable on a winch provided on the tractor, to raise the logs with the logs depending from the boom. Such a load tends to pull the rear of the tractor downwardly and to exert a lifting force on the front of the tractor. If such is too severe, traction and maneuverability of the tractor can be seriously affected. To counteract such tendencies, and make the tractor more stable, wheel support may be provided the logging boom which, since it directly supports the load, inhibits front end lifting tendencies.

A general object of this invention is to provide an improved construction for the wheel-supported boom of such a tractor and boom combination, which takes care of such front end lifting tendencies in a highly practical and satisfactory manner.

Frequently log hauling is done where roads are poor or substantially nonexistent, and terrain traversed is uneven, muddy and provides limited clearance for a tractor. It is important, therefore, that the wheel-supported boom be constructed so that it does not easily become mired, and does not adversely affect the maneuverability of, and the clearance required for, the tractor. Thus, another general object of the invention is to provide an improved construction for a tractor and boom combination where the maneuverability of the tractor is good, and that is well suited for use where muddy, rough conditions exist.

In an embodiment of the invention, an elongated upstanding boom is mounted on the rear of a tractor frame, and the boom inclines upwardly and rearwardly from the tractor. At the base of the boom, and in the connection of the boom with the tractor, are a pair of horizontal swivel plates interconnected at their centers by means accommodating relative rotation about an upright axis. One of the plates is part of the boom, and the other is part of a bracket which at a forward portion thereof is pivotally connected to the rear of the tractor by pivot means accommodating movement of the bracket about a horizontally extending transverse axis. The pivot provided for the bracket enables the bottom of the boom to swing up and down, thus to take care of unevenness in ground contour. Were the tractor to start a steep climb, for instance, with its rear end moving down toward the ground, the pivot of the bracket permits the boom base to shift upwardly relative to the tractor rear end, prior to the time the boom follows the climb of the tractor. The boom itself swivels about the upright axis about which the swivel plates are relatively rotatable. Forces exerted on the boom, such as would cause twisting and turning of the boom, are adequately withstood by the swivel plates, which have expanses surrounding the upright rotation axis of the plates spaced radially outwardly some distance from the axis. The swivel plates enable the boom to swing when the tractor makes a turn, with the boom swinging toward the logs pulled by the tractor.

Supporting the boom, and effective to inhibit front-end lifting of the tractor, are dolly wheels journaled on structure depending from the boom and constrained to a line of travel extending longitudinally of the boom. The wheels, because of this construction, always remain directly under the boom, where they are in proper position to give optimum support. Further, such a construction in practice has exhibited minimum tendencies to become mired.

A more specific object of the invention, therefore, is to provide a vehicle equipped with a boom wherein the boom is supported by wheels constrained to movement in a line of travel extending longitudinally of the boom, and where turning of the boom with respect to the vehicle is facilitated by a swivel connection between the boom and vehicle.

Another object is to provide an improved vehicle and boom combination, where wheel means support the boom, and in the connection of the boom with the vehicle a pair of swivel plates are provided, disposed adjacent the base of the boom, one of which is part of the boom and the other of which is connected to the rear of the tractor, such plates holding the boom upright and resisting stresses applied thereto while accommodating swiveling of the boom.

A related object is to provide such a construction where the swivel plate connected to the rear of the tractor is part of a bracket pivotally connected to the tractor for pivotal movement about a horizontally extending transverse axis, whereby such bracket may swing up and down as the boom and tractor pass over uneven ground contours. The construction gets away from rear end overhang in the tractor.

Still another object is to provide such a construction where the swivel plates may be locked from relative rotation, with the boom in a position aligned with the longitudinal axis of the tractor. This is particularly important when it is necessary for the tractor to take a sharp turn where side clearance is limited, as it results in any logs trailing the boom moving in a wider sweep during the turn than would be the case if the boom were allowed to swivel on the turn.

Other objects and advantages are attained by the invention, and the same is described hereinbelow in conjunction with the accompanying drawings, wherein:

FIG. 1 is a side elevation of the rear end of a tractor having a boom, constructed according to an embodiment of this invention, with the boom connected to the rear of the tractor frame and extending upwardly and inclining rearwardly therefrom;

FIG. 2 is a view looking down at the top of the base of the boom, generally along the line 2—2 in FIG. 1; and FIG. 3 is an elevation of rear end portions of the boom and showing the wheels that support it, such view being taken generally along the line 3—3 in FIG. 1.

Referring now to the drawings, 10 indicates generally rear end portions of a tractor frame. Mounted on either side of the tractor frame, and supporting it for movement over the ground, are crawler treads, such as the one indicated in outline at 14. In FIG. 1 the crawler tread on the near side of the tractor has been removed, better to illustrate the connection of the boom with the tractor frame. The tractor disclosed is a crawler tractor, since in the Pacific Northwest this type of tractor is used frequently in logging operations. While such a tractor is disclosed, it should be understood that other forms of tractors could be used, such as the usual wheel-supported tractors, if such use were found desirable.

Mounted on the rear end of tractor frame 10 and projecting toward the rear of the tractor is a winch 16, including a power-driven winch drum 18. Winch drum 18 is suitably journaled at its end in winch mounting frame 20. A cable or line 22 wound on the winch drum is used in grappling the ends of bundles of logs, during the lifting and moving of the logs.

Extending upwardly and rearwardly from the tractor frame, with its base somewhat toward the rear of winch 16, is a boom construction generally indicated at 26. This comprises an elongated boom member 28, and secured to and depending downwardly from an intermediate portion of the boom member an A-frame section 30. Boom member 28 and the legs 30a, 30b of the A-frame section 30 are shown made of tubular stock, with the top ends of the legs suitably secured as by welding to member 28. Supporting the boom construction for rolling movement over the ground are dolly wheels 36, 38 and 40 mounted on legs 30a, 30b. Boom construction 26 is connected to the tractor frame through a swivel means or mechanism indicated generally at 46, and a pivotable bracket means or yoke 48.

Considering now more particularly the construction of swivel means or mechanism 46, 50 and 52 indicate a pair of swivel plates or plate portions that are substantially horizontal, with one stacked on top of the other. In the embodiment illustrated, the bottom plate portion 50 has bracket legs 48a, 48b extending forwardly therefrom, and thus the plate portion and legs together make up bracket 48. Between swivel plate portions are wear and spacer rings 54, 56. The top wear and spacer ring 54 is secured as by welding to top swivel plate 52, and similarly the bottom wear and spacer ring 56 is secured as by welding to the bottom swivel plate 50. The swivel plates are maintained in proper position, with one on top of the other and with the wear and spacer rings aligned and interposed between them, by a stud 60 joined to upper swivel plate 52. The stud extends downwardly from plate 52 through accommodating bores 62 and 64 provided the swivel plates and through the centers of the wear and spacer rings into a sleeve 66 integral with the bottom swivel plate. Secured by screw 67 to the base of stud 60 is a retainer cap 68. This has an outer edge overlying the end of sleeve 66.

From the construction described, it should be obvious that the two swivel plates are relatively rotatable. Such rotation occurs about a substantially upright axis, indicated in FIG. 1 at 70. The upper swivel plate is secured as by welding to the bottom of boom member 28 and to braces 71 of the boom construction. Thus, it is integral with the boom construction and turns therewith. As already noted the bottom swivel plate portion is part of bracket means 48, and as will be described below the bracket means is connected to the tractor by means accommodating only pivotal movement of the bracket means about a transverse horizontal axis. On a tractor turn, therefore, it is the swivel plates that permit swinging of the boom construction to one side of the tractor. The swivel plates have a large expanse about rotation axis 70, and function, with the tractor going straight forward or on a turn, to withstand twisting stresses applied to the boom.

Under certain conditions, as when side clearance is limited, and when moving the tractor without using the boom, it is desirable to lock the boom construction in place, with the boom construction extending directly to the rear of the tractor and aligned with the longitudinal axis of the tractor. A selectively adjustable, releasable latch mechanism is included, that enables the swivel plates to be locked together with the boom construction occupying this aligned position. Such latch mechanism is indicated generally in the figures at 76.

Describing the latch mechanism 76, 78 indicates a latch member hinged to bracket means 48 at 80. The rear end of the latch member is movable in an arc toward and away from the sides of the swivel plate portions. A detent 82 integral with the rear end of the latch member fits into notches 84 provided the top and bottom swivel plates when such notches are aligned, and when so fitted locks the swivel plates together. The notches align themselves when the boom construction is aligned with the longitudinal axis of the tractor. The latch member may be swung in an arc (downwardly in FIG. 2) to release the swivel plates.

Release of the latch members is accomplished by pulling on a cord 90 which extends through a guide member 92 and around a pulley 94 mounted on a post 95 which is part of a protective screen 97 provided at the rear of the tractor. A weight 96 is slidable up and down on line 98 mounted on post 95, and by pulling on cord 90 functions to prevent slackness in cord 90. A coiled tension spring is indicated at 99, which has a bias sufficient to override the gravitational pull on weight 96, so that the spring operates to prevent disengagement of the latch member. When cord 90 is pulled, member 78 swings over center, and then spring 99 operates to keep the latch member disengaged.

Bracket means 48 (which includes bottom swivel plate portion 50) has a U-shaped outline, as can best be seen with reference to FIG. 2. Legs 48a, 48b of the bracket means are pivotally connected by pivot connections 103 to braces 104, 106. The braces in turn are secured as by screws 108 to the tractor frame 10 so that in effect they are part of the frame. The pivot connections accommodate swinging of the bracket means 48 about a horizontal axis extending transversely of the tractor (indicated at 109), with the rear portion of the bracket means (containing the bottom swivel plate portion) swinging in an arc up and down. Note that the pivot connections are spaced baove the base and forwardly of the rear end of winch frame 20. Thus, the overhang at the rear of the tractor is not increased by any rigid structure that could cause clearance troubles in rough terrain. In moving through a gulley, for instance, when frame 10 of the tractor dips down as the tractor starts to climb out, the boom structure moves up and out of the way of possible ground contact.

Considering now the mounting of dolly wheels 36-40, these are journaled on axles mounted on arms indicated at 110, 112, and 114. Arms 112 and 114 are joined by a bar portion 116 integral with the arms, such bar position in turn being secured to the base of legs 30a, 30b. Arm 112 is connected by detachable means to bar portion 116 that joins arms 110, 114, enabling removal of the arm. Thus, in the embodiment shown, screws 118 connect the arm to bar portion 116. Arm 112 is removable, to facilitate replacement and repair of wheels 36-40.

Completing the description of the boom, journaled on the top of boom member 28 are fair lead rollers 120 (the rear roller is obscured by the front one in FIG. 1). Cable 22 passes between the fair lead rollers, and is supported at the top of the boom on roller 124. The end of the cable is equipped with the usual grappling hook 126. This is hooked onto a hook 128 mounted on the frame when it is desired to raise the boom using the power of the winch.

The operation of the boom is believed obvious. To pick up a bundle of logs, cable 20 is payed out of drum 18 and suitably secured about the end of a bundle of logs. The drum is then rotated to draw in the cable, with the end of the bundle finally being lifted from the ground and supported by the boom. On forward travel of the tractor, the bundle travels behind the boom with the boom swinging on a turn in the direction of the trailing logs. During a turn, and during forward travel of the tractor, the dolly wheels are directly under the boom, as they are constrained by their mounting to a line of travel extending longitudinally of the boom (as compared to a swivel wheel which could veer from side to side). Where clearance is limited, the boom may be locked in a position extending directly to the rear of the tractor, and on turns this will have the effect of swinging the log bundle around in a wide sweep.

After a bundle of logs is released, the boom may be lifted clear of the ground for the return trip. Usually at this time the boom also is locked in its longitudinally aligned position. To lift the boom, cable 22 is pulled back to the rear of the tractor and hooked onto hook 128. When the cable is then wound up on the winch drum, as the cable tenses the boom pivots about pivot connections 103 and upwardly to a raised position.

We claim:

1. In combination with a tractor having a tractor frame and lateral support means on either side of the frame for supporting the tractor for movement over the ground, a winch mounted on said tractor frame adjacent the rear of the tractor and having a winch cable connected to the winch adapted to be taken up by operation of the winch, an elongated upright and rearwardly inclining boom member with means at the top thereof for guiding said line thereover, wheels for supporting the boom mounted on the boom, swivel means connected to the base of said boom enabling swiveling of the boom about an upright axis, and means connecting said swivel means to said tractor frame, said means including a yoke member with a pair of legs extending forwardly of said swivel means and straddling said winch, and pivot means connecting forward portions of said legs to said tractor frame with the legs pivotable about a horizontal axis extending transversely of the tractor, said pivot means being disposed above the base of said winch and toward the front of the tractor from the rear of said winch.

2. The construction of claim 1 which further comprises means for operatively connecting said winch cable to said boom whereby the cable may be employed to raise said boom and to shift said wheels out of ground contact, and selectively adjustable means for locking said swivel means from swivel movement whereby said boom may be stabilized when the same is raised.

3. In combination with a tractor including a tractor frame, a winch mounted on said frame, a winch line connected to the winch adapted to be taken up by operation of the winch, a pivotable bracket mounted on a rear portion of said frame, pivot means pivotally connecting a forward portion of said bracket to said frame with a rear portion of said bracket swingable up and down in an arc at the rear of said frame, a boom extending upwardly and inclining rearwardly from the rear portion of said bracket, swivel mechanism connecting the base of said boom and the rear portion of said bracket and accommodating swiveling of the boom about a substantially upright swivel axis, ground-engaging wheel means depending from said boom and located to the rear of said swivel mechanism for supporting the boom, means for operatively connecting said winch line to said boom whereby upon said winch line being taken up by the winch said boom is raised to shift said wheel means out of ground contact, and means for locking said swivel mechanism from swivel movement whereby said boom may be stabilized when the same is raised to shift said wheel means out of ground contact.

4. For a tractor having a tractor frame, a winch mounted on said tractor frame adjacent the rear of the tractor, a winch line connected to said winch adapted to be taken up by operation of the winch, a yoke member having legs straddling said winch, means pivotally mounting the forward ends of said legs on said tractor frame, a wheel-supported boom extending rearwardly of said yoke member, swivel means connecting said boom to a rear portion of said yoke member accommodating swiveling of the boom about an upright axis, and means for operatively connecting said winch line to said boom whereby said line may be used to raise said boom with pivotal movement of said yoke member about said pivot means.

References Cited in the file of this patent

UNITED STATES PATENTS

| | | |
|---|---|---|
| 660,020 | Marshall | Oct. 16, 1900 |
| 2,339,582 | Peterson | Jan. 18, 1944 |
| 2,518,322 | Hovey-King et al. | Aug. 8, 1950 |
| 2,691,451 | Westfall | Oct. 12, 1954 |
| 2,710,760 | Branstrator et al. | June 14, 1955 |
| 2,793,770 | St. Denis | May 28, 1957 |
| 2,890,065 | Shaffer | June 9, 1959 |